(12) United States Patent
Kim et al.

(10) Patent No.: US 10,033,814 B2
(45) Date of Patent: Jul. 24, 2018

(54) VEHICLE SECURITY NETWORK DEVICE AND DESIGN METHOD THEREFOR

(71) Applicant: ICTK CO., LTD., Gyeonggi-do (KR)

(72) Inventors: Dong Kyue Kim, Seoul (KR); Byong Deok Choi, Seoul (KR); Kwang Hyun Jee, Gyeonggi-do (KR)

(73) Assignee: ICTK Holdings Co., Ltd., Gyeonggi-do (KR)

( * ) Notice: Subject to any disclaimer, the term of this patent is extended or adjusted under 35 U.S.C. 154(b) by 0 days.

(21) Appl. No.: 15/028,313

(22) PCT Filed: Oct. 8, 2014

(86) PCT No.: PCT/KR2014/009481
§ 371 (c)(1),
(2) Date: Apr. 8, 2016

(87) PCT Pub. No.: WO2015/053559
PCT Pub. Date: Apr. 16, 2015

(65) Prior Publication Data
US 2016/0255154 A1 Sep. 1, 2016

(30) Foreign Application Priority Data
Oct. 8, 2013 (KR) .......... 10-2013-0120043
Oct. 8, 2014 (KR) .......... 10-2014-0135945

(51) Int. Cl.
H04L 29/08 (2006.01)
G09C 1/00 (2006.01)
(Continued)

(52) U.S. Cl.
CPC .......... *H04L 67/12* (2013.01); *G09C 1/00* (2013.01); *H01L 23/528* (2013.01);
(Continued)

(58) Field of Classification Search
CPC .................................. H04L 9/3278
See application file for complete search history.

(56) References Cited

U.S. PATENT DOCUMENTS 6,996,716 B1 * 2/2006 Hsu .......... H04L 63/08
370/352
7,576,637 B2 * 8/2009 Flick .......... B60R 25/04
340/426.1
(Continued)

FOREIGN PATENT DOCUMENTS

EP 2570309 A1 3/2013
KR 1020090064690 A 6/2009
(Continued)

OTHER PUBLICATIONS

Burton et al., "Automotive Functional Safty = Safety + Security", Aug. 17-19, 2012, SecurIT'12, pp. 150-159.*
(Continued)

Primary Examiner — Morshed Mehedi
(74) Attorney, Agent, or Firm — McCoy Russell LLP

(57) ABSTRACT

A security system capable of preventing a security attack/threat on a vehicle network is provided. At least one security zone is set by using a risk level which is evaluated for a plurality of vehicle functional elements. In addition, a security countermeasure corresponding to the risk level of the security zone can be provided to a conduit of the security zone so as to perform gate keeping.

17 Claims, 10 Drawing Sheets

(51) Int. Cl.
  *H04L 9/32* (2006.01)
  *H01L 23/522* (2006.01)
  *H01L 23/528* (2006.01)
  *H01L 23/544* (2006.01)
  *H04L 29/06* (2006.01)
  *B60R 25/00* (2013.01)

(52) U.S. Cl.
  CPC ........ *H01L 23/5226* (2013.01); *H01L 23/544* (2013.01); *H04L 9/3278* (2013.01); *H04L 63/06* (2013.01); *H04L 63/08* (2013.01); *H04L 63/1433* (2013.01); *B60R 25/00* (2013.01); *H01L 2223/54413* (2013.01); *H04L 2209/84* (2013.01)

(56) References Cited

U.S. PATENT DOCUMENTS

| | | | | |
|---|---|---|---|---|
| 8,104,075 | B2* | 1/2012 | Spector | G06F 21/604 |
| | | | | 726/1 |
| 2004/0185842 | A1* | 9/2004 | Spaur | B60R 25/04 |
| | | | | 455/420 |
| 2006/0142917 | A1* | 6/2006 | Goudy | B60K 35/00 |
| | | | | 701/45 |
| 2013/0101114 | A1 | 4/2013 | Kim et al. | |
| 2013/0212659 | A1* | 8/2013 | Maher | H04L 63/06 |
| | | | | 726/6 |
| 2015/0005981 | A1* | 1/2015 | Grimm | G07C 5/008 |
| | | | | 701/1 |
| 2015/0256534 | A1* | 9/2015 | Goudy | H04L 63/0823 |
| | | | | 713/156 |

FOREIGN PATENT DOCUMENTS

| | | |
|---|---|---|
| KR | 1020110096335 A | 8/2011 |
| KR | 1020130058158 A1 | 6/2013 |

OTHER PUBLICATIONS

ISO 26262-2: International Standard, "Road Vehicles—Functional Safety—Part 2: Management of Functional Safety," Reference No. ISO 26262-2:2011(E), First Edition, Nov. 15, 2011, 460 pages. (Submitted in two parts).

ISA Korean Intellectual Property Office, International Search Report Issued in Application No. PCT/KR2014/009481, dated Jan. 26, 2015, WIPO, 4 pages.

Henniger, O. et al., "Security requirements for automotive on-board networks," 9th International Conference on Intelligent Transport Systems Telecommunications, Oct. 20, 2009, Lille, France, 6 pages.

Burton, S. et al., "Automotive Functional Safety = Safety + Security," Proceedings of the First International Conference on Security of Internet of Things, Aug. 17, 2012, Kollam, India, 10 pages.

Ward, D. et al., "Threat Analysis and Risk Assessment in Automotive Cyber Security," SAE International Journal of Passenger Cars—Electronic and Electrical Systems, vol. 6, No. 2, Apr. 8, 2013, 7 pages.

European Patent Office, Extended European Search Report Issued in Application No. 14852713.8, dated May 24, 2017, Germany, 6 pages.

* cited by examiner

VEHICLE SECURITY NETWORK DEVICE AND DESIGN METHOD THEREFOR

CROSS REFERENCE TO RELATED APPLICATIONS

The present application is a U.S. National Phase of International Patent Application Ser. No. PCT/KR2014/009481, entitled "VEHICLE SECURITY NETWORK DEVICE AND DESIGN METHOD THEREFOR," filed on Oct. 8, 2014, which claims priority to Korean Patent Application No. 10-2013-0120043, entitled "VEHICLE SECURITY NETWORK DEVICE AND DESIGN METHOD THEREFOR," filed on Oct. 8, 2013, and Korean Patent Application No. 10-2014-0135945, entitled "VEHICLE SECURITY NETWORK DEVICE AND DESIGN METHOD THEREFOR," filed on Oct. 8, 2014, the entire contents of each of which are hereby incorporated by reference for all purposes.

TECHNICAL FIELD

One or more example embodiments relate to a field of vehicle system security, and more particularly, to a security device for a network access to functional elements included in a vehicle and a method of designing the security device.

BACKGROUND ART

Due to a recent change in an automobile industry environment, shares of electronic and electric components of a vehicle (hereinafter referred to as 'electronic parts' in combination) has been increasing among other various parts and systems of the vehicle, and an importance of software of a vehicle has also been increasing. In addition, a communication between electronic control units (ECUs) based on a distributed network in a vehicle may enable the provision of various functions and services. Thus, a more emphasis has been placed on an importance of a vehicular functional safety, and an international standard on designing a vehicle based on the vehicular functional safety, for example, ISO 26262, was established. The vehicular functional safety is applied to increase a product reliability by decreasing a failure rate of electronic parts of a vehicle, increase safety for a driver through a failure diagnosis and safety mechanism, increase an availability of a vehicle through a product design process and a maintenance and repair system, and the like.

Further, using information and communication technology, a vehicle may evolve further to provide various services through a communication between parts in the vehicle, a vehicle-to-infrastructure (V2I) communication, a vehicle-to-vehicle (V2V) communication, and a communication between the vehicle and a smartphone of a driver. In addition, due to introduction of a network communication of a vehicle and parts and components of the vehicle, vehicle platooning and autonomous vehicle traveling in which interests have recently been increasing may be enabled.

However, such an increase in the shares of the electronic parts and software and the provision of services through communication connectivity may also increase a risk of security. For example, when an intentional error or failure occurs in an electronic part or software of a vehicle due to an attack or a threat on security, availability and safety ensured by the functional safety may be damaged.

However, the ISO 26262 may analyze only a risk based on a system design error and a random failure, but not consider a risk from a security attack, for example, a risk from a malfunction of a vehicle and vehicle parts by a malicious code or hacking.

DISCLOSURE

Technical Solutions

An aspect of the present disclosure provides a vehicular security network device that may analyze a risk to security of a vehicle and provide a security countermeasure against the analyzed risk. Another aspect of the present disclosure provides a method of designing a vehicular security network.

According to an aspect of the present disclosure, there is provided a vehicular security network device including a conduit configured to connect, to an external network, a first security zone including a plurality of functional elements having a same risk level assessed based on a vehicular security risk assessment matrix, and a first gate keeper disposed on the conduit and configured to control an access to the plurality of functional elements.

When the risk level is higher than or equal to a predetermined level, the first gate keeper may include a plurality of independent security elements. In such a case, at least one of the independent security elements may be embodied by a hardware-based security element. Illustratively yet not limited, the hardware-based security element may use an authentication key to be held by a physical unclonable function (PUF). The authentication key being held by the PUF may be construed as being at least one key required for an encoding/decoding algorithm to be generated and/or maintained by the PUF.

The predetermined level may be a top level among classifiable security levels. For example, a risk level is classified into three or four risk levels. The risk level may be a target security level.

The risk level may be a result of lookup from a vehicular security risk assessment matrix using assessment values associated with a level of likelihood of damage (D) indicating a level of a likelihood of damage caused by a security attack, a level of severity (S) of the damage when the damage occurs, and a level of controllability (C) of the damage when the damage occurs.

Illustratively yet not limited, when there is a high likelihood of a functional element of the vehicle being damaged by a security attack, the level of likelihood of damage (D) may be assessed to be high. The level of likelihood of damage (D) may be determined by a combination of a level of threat realized (T) and a level of vulnerability exploited (V).

When a level of damage incurred when a security attack is successfully made, for example, when an injury inflicted on a human being by such a security attack is severe, the level of severity (S) may be assessed to be high. In addition, based on whether the damage is controllable by a driver or an external controller, the level of controllability (C) may be assessed. For example, the level of severity (S) and the level of controllability (C) may be values assessed based on an international standard ISO 26262.

The at least one security zone may be hierarchically set. For example, the first security zone may be a subzone of a second security zone having a risk level lower than the risk level corresponding to the first security zone. In such an example, the vehicular security network device may further include a second gate keeper disposed on a conduit between the second security zone and the external network and configured to control an access to the second security zone. The second gate keeper, which is a super zone of the first gate keeper, may include a security element that may provide lower-level security than security provided by the first gate keeper.

According to another aspect of the present disclosure, there is provided a vehicular security network designing device including at least one processor. The vehicular security network designing device may include a risk level assigner configured to assign a risk level to each of a plurality of functional elements connected to a controller area network (CAN) of a vehicle based on a result of lookup from a risk assessment matrix, in response to an input of a level of likelihood of damage (D) indicating a level of a likelihood of damage caused by a security attack, a level of severity (S) of the damage when the damage occurs, and a level of controllability (C) of the damage when the damage occurs, a zone setter configured to set at least one security zone by grouping the plurality of functional elements into security zones based on the assigned risk level, and a design unit configured to dispose, on a conduit between a first security zone and an external network, a first gate keeper corresponding to a first risk level of the first security zone among the at least one security zone. At least one of the risk level assigner, the zone setter, and the design unit may be implemented by the at least one processor configured to operate in accordance with a programmed algorithm.

The zone setter may group functional elements of a same assigned risk level into one security zone. The zone setter may calculate a security level vector including the assigned risk level and a core security requirement of the plurality of functional elements. In addition, the zone setter may set the at least one security zone by grouping the plurality of functional elements based on the calculated security level vector.

When the first risk level is higher than or equal to a predetermined level, the first gate keeper may include a plurality of independent security elements. At least one of the independent security elements may be embodied by a hardware-based security element. Illustratively yet not limited, the hardware-based security element may use an authentication key to be held by a PUF.

According to still another aspect of the present disclosure, there is provided a method of designing a vehicular security network to be performed by hardware including at least one processor, the method including assessing a risk level of a plurality of functional elements of a vehicle using a risk assessment matrix, setting at least one security zone by grouping the plurality of functional elements into security zones based on the assessed risk level, and designing a first gate keeper of a security level corresponding to a first risk level of a first security zone among the at least one security zone to be disposed on a conduit between the first security zone and an external network.

The risk level may be a result of lookup from the risk assessment matrix using assessment values associated with a level of likelihood of damage (D) indicating a level of a likelihood of damage caused by a security attack, a level of severity (S) of the damage when the damage occurs, and a level of controllability (C) of the damage when the damage occurs. The level of likelihood of damage (D) may be determined by a combination of a level of threat realized (T) and a level of vulnerability exploited (V). For example, the level of severity (S) and the level of controllability (C) may be values assessed based on an international standard ISO 26262.

BEST MODE FOR CARRYING OUT INVENTION

Figure 1:
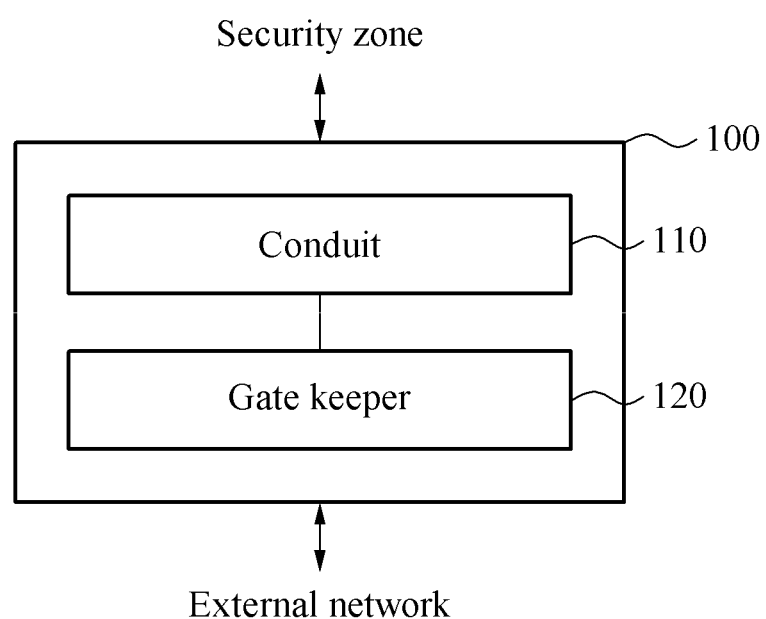
FIG. 1 is a block diagram illustrating a vehicular security network device according to an embodiment.

Hereinafter, some example embodiments will be described in detail with reference to the accompanying drawings.

It should be understood, however, that there is no intent to limit this disclosure to the particular example embodiments disclosed. Regarding the reference numerals assigned to the elements in the drawings, it should be noted that the same elements will be designated by the same reference numerals, wherever possible, even though they are shown in different drawings.

Terms most generally and widely used in a related technical field are used herein. However, other terms may be selected based on development and/or change of related technologies, practices, preferences by one of ordinary skill in the art, and the like. Thus, the terminology used herein is for the purpose of describing particular embodiments only and is not intended to limit technical features.

In addition, terms selected by an applicant(s) may also be used herein, and the meanings of such terms are described in the Detailed Description section. The terms used herein are not to be interpreted based solely on the terms themselves, but to be interpreted based on the meanings of the terms as defined herein and the overall context of the present disclosure.

FIG. 1 is a block diagram illustrating a vehicular security network device according to an example embodiment.

According to an example embodiment, a vehicular security network device, hereinafter simply referred to as a device 100, includes a first conduit 110, which is a sole network path connecting a first security zone to an external network. For example, the first security zone may be construed as being a logical and/or physical zone including a plurality of functional elements of a vehicle. Functional elements included in a same security zone may have a same risk level.

A risk level may be a result of lookup from a risk assessment matrix using assessment values associated with a level of likelihood of damage (D) indicating a level of a likelihood of damage caused by a security attack, a level of severity (S) of the damage when the damage occurs, and a level of controllability (C) of the damage when the damage occurs. The level of likelihood of damage D may be determined by a combination of a level of threat realized (T) and a level of vulnerability exploited (V). The level of severity (S) and the level of controllability (C) may be values to be assessed by an international standard ISO 26262. A detailed description of such risk assessment will be provided with reference to FIG. 6.

In addition, the device 100 includes a first gate keeper 120 applied to, for example, disposed on, the first conduit 110 and configured to block an unauthenticated access to the first security zone. The first gate keeper 120 may be determined to have a security level corresponding to a risk level and a required security level for a zone associated with the first conduit 110.

For example, when the risk level and the required security level is a highest level, a gate keeper may include a plurality of security elements, which may be independent from one another. In addition, at least one of the security elements may include a hardware-based security element. An example of the hardware-based security element may be a security element using an authentication key to be held by a physical unclonable function (PUF).

A security zone may be distinguishable from another zone in a network topology. Different security zones may be independent from one another, but one zone may be a subzone of another zone according to an example embodiment. For example, the first security zone may be a subzone of a second security zone (not shown) having a risk level lower than the risk level corresponding to the first security zone. In such an example, the device may further include a second gate keeper (not shown) disposed on a conduit between the second security zone and the external network and configured to control an access to the second security zone. Since a security level required for the second security zone is relatively lower than the security level required for the first security zone, the second gate keeper may include a security element that may obtain a lower security level than the first gate keeper 120. A more detailed description will be provided with reference to FIG. 2.

Figure 2:
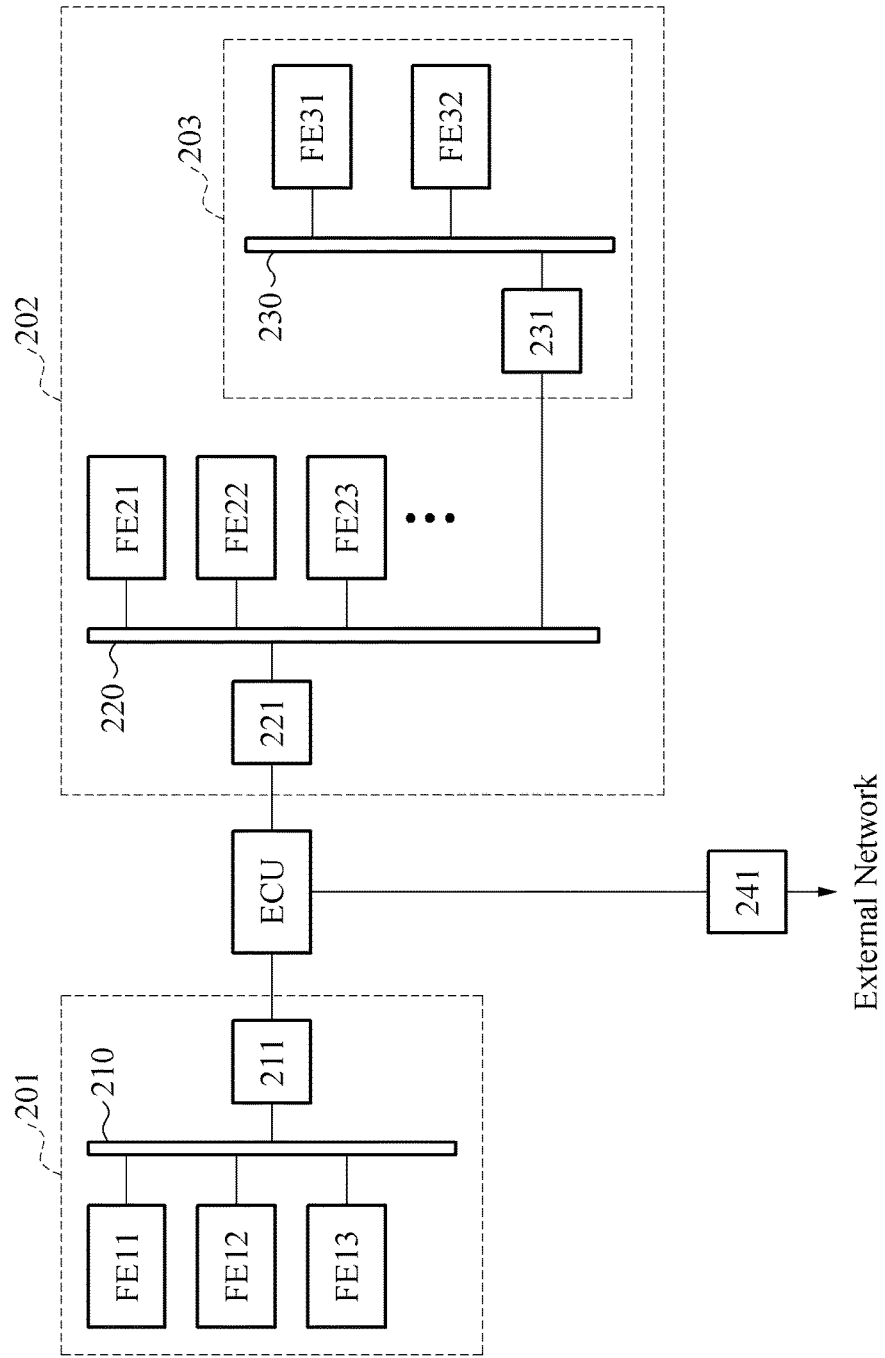
FIG. 2 is a diagram illustrating a structure of a security zone and a conduit according to an embodiment.

FIG. 2 is a diagram illustrating a structure of a security zone and a conduit according to an example embodiment.

A plurality of zones and conduits may be set based on risk assessment performed for functional elements (FE) or functional units. For example, a security zone 201 may include functional elements having a same required security level, for example, FE11, FE12, and FE13, and is connected to the outside of the security zone 201 through a conduit 210. A gate keeper 211 is disposed on the conduit 210 to control an access to the security zone 201 by an external source.

A security zone 202 includes functional elements, for example, FE21, FE22, and FE23, and is connected to the outside of the security zone 202 through a conduit 220. A gate keeper 221 is disposed on the conduit 220 to control an access to the security zone 202 by an external source. The security zone 202 may include a subzone 203. Here, hierarchical zone setting may be understood from such an example.

The subzone 203 includes functional elements, for example, FE31 and FE32, and is connected to the outside of the subzone 203 through a conduit 230. A gate keeper 231 is disposed on the conduit 230 to control an access to the subzone 203 by an external source. As described in the foregoing, the gate keeper 221 may include a security element that obtains lower-level security than that of the gate keeper 231. That is, the gate keeper 231 configured to maintain security of the subzone 203 may be embodied by the security element of a higher level than the gate keeper 221, for example, a hardware-based security element. A detailed description will be provided with reference to FIG. 3A.

Figure 3A:
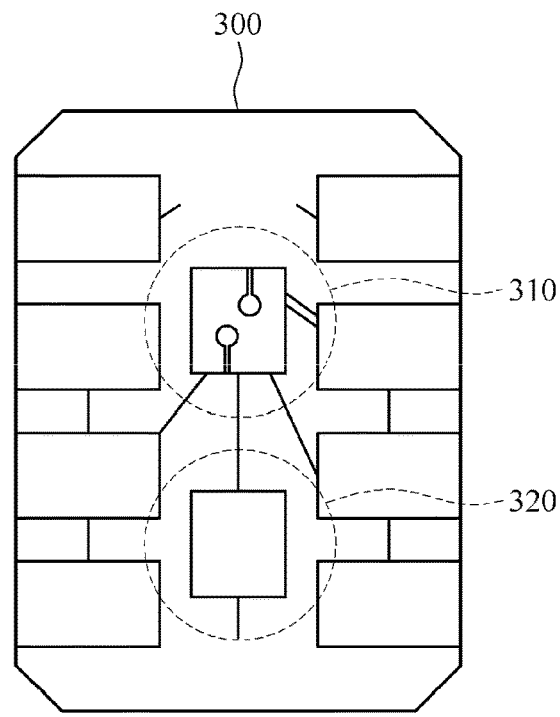
FIGS. 3A and 3B are diagrams illustrating implementation of gate keepers according to at least one embodiment.

FIG. 3A is a diagram illustrating implementation of a gate keeper according to an example embodiment.

As described above, a gate keeper 300 is embodied in a form that is referred to as a single or more security element, but not be construed as being embodied as a limited form by the name and illustrated form.

The gate keeper 300 includes a first security element (SE) 310 and a second security element 320. Although the first security element 310 and the second security element 320 are embodied as a single chip or a package form, it may be embodied as separate packages in lieu of a physically single package.

The first security element 310 may control network connectivity, and provide hardware and/or software based security. For example, the first security element 310 may correspond to a smart card. The second security element 320 may be a hardware-based security element, for example, a hardware-based one-time password (HW OTP) module.

According to an example embodiment, the first security element 310 and the second security element 320 may perform gate keeping to control an access to a security zone. Since a plurality of security elements independently perform authentication, security by multi-factor or by multi-system may be implemented. Among security elements to provide the multi-system security, a detailed example of operations of the second security element 320 for hardware-based security will be described with reference to FIGS. 4A and 4B.

Such a multi-system security may be provided for a security level for which a top-level security method design is required. For example, when a security level assessed for functional elements of a vehicle is classified into four levels, for example, risk 1 through risk 4, the gate keeper 300 may be used to provide the multi-system security as a security countermeasure for a functional element and/or a security zone corresponding to risk 4, which is a highest security level. As necessary, such a multi-system security may be provided for risk 3, which is a lower than the highest security level, in addition to the highest security risk level.

Figure 3B:
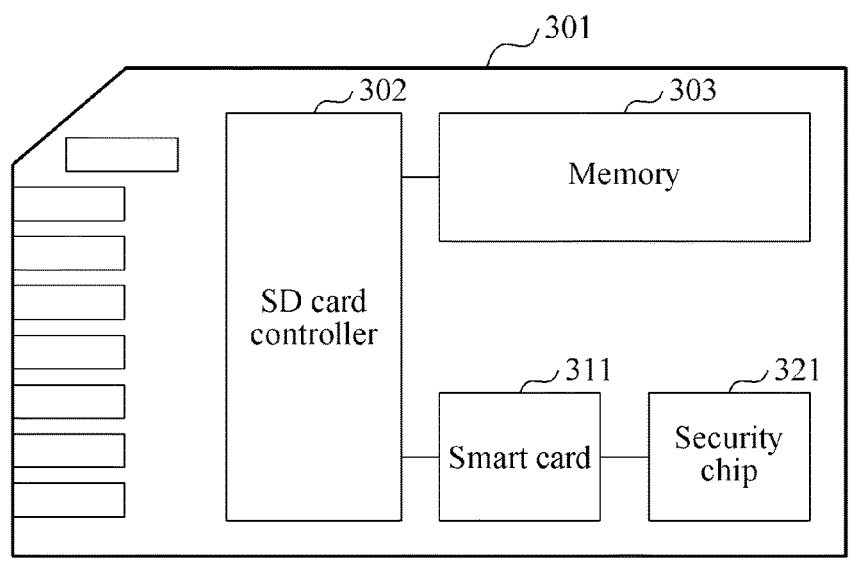

FIG. 3B is a diagram illustrating implementation of a gate keeper according to another example embodiment.

In an example illustrated in FIG. 3B, to control an access to a secure digital (SD) card 301 and/or an access by the SD card 301, a plurality of security elements is arranged as a gate keeper. Since the SD card 301 may be used to store and transmit data of a vehicle or a device provided in the vehicle, the gate keeper to be disposed on a conduit for the SD card 301 may need to include a top-level security element, for example, a hardware-based security element, in a case that a risk level to be assessed is high. A function of an SD card controller 302 or a memory 303 may be similar to those commercially used for an SD card.

A smart card 311 may be provided as a first security element, and a security chip 321 may be provided as a second security element. Here, at least one of these may be the hardware-based security element.

Figure 4A:
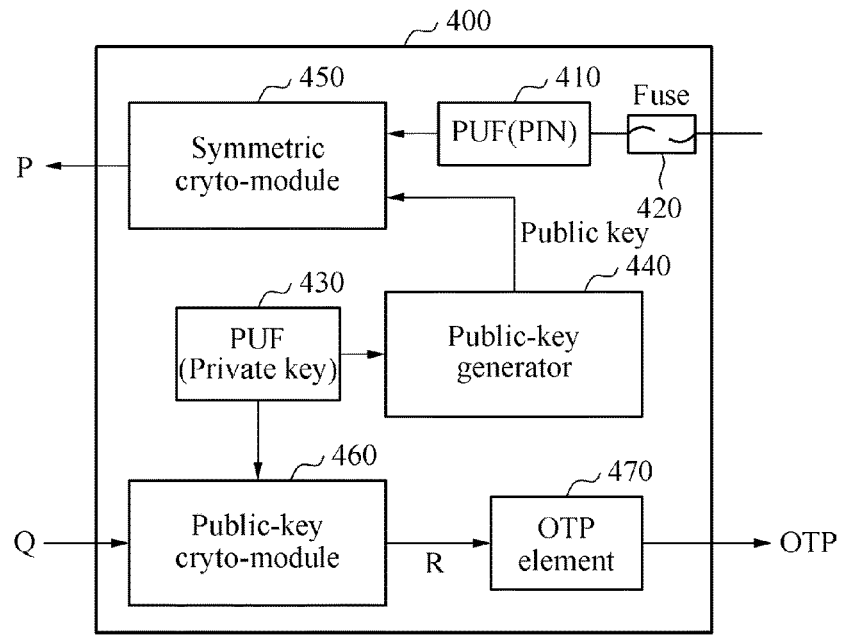
FIGS. 4A and 4B are diagrams illustrating a portion of a hardware-based security element according to at least one embodiment.

FIG. 4A is a diagram illustrating a portion of a hardware-based security element according to an example embodiment.

According to an example embodiment, a security element 400 may correspond to at least a portion of the hardware-based element, for example, 320 or 321, described with reference to FIGS. 3A and 3B. For example, a security element may include a first PUF 430 configured to generate a private key to enable public key-private key based encoding and decoding along with an external certification authority (CA). A detailed description of implementation of a PUF will be provided with reference to FIG. 5. Here, the CA may not indicate only a CA outside a security zone, but also include an entity outside the security element 400 that may perform secure authentication. For example, the CA may be an electronic control unit (ECU) in a security zone, as necessary. Alternatively, the CA may be a functional element or another security element included in multi-system security.

In addition, the security element 400 may include a second PUF 410 configured to generate a personal identification number (PIN) that is used to identify the security element 400. Hereinafter, the first PUF 430 is referred to as a PUF (private key), and the second PUF 410 is referred to as a PUF (PIN).

The security element 400 may include an interrupter 420. The interrupter 420 may be a path to safely extract the PIN identifying the security element 400 before the security element 400 is distributed and used. The interrupter 420 may be a physical and/or logical configuration that may completely and physically block the PIN extracting path, for example, PIN_out, after the PIN is initially extracted in a safe state, and may be embodied by a fuse as illustrated.

A public key generator 440 may generate a public key symmetrical to a private key, using the private key generated by the PUF (private key). When the public key needs to be transferred to the external CA, a symmetric key-based crypto-module 450 may generate P obtained by encoding the public key using, as a key value, the PIN generated by the PUF(PIN) 410, and the P may be transferred to the external CA.

When the external CA needs a one-time password (OTP) authentication process of a challenge-response type, the external CA may send, to the security element 400, Q obtained by encoding a random number R corresponding to a challenge using the public key. The Q, which is obtained by encoding the R using the public key of the security element 400, may be decoded using the private key of the security element 400. Thus, a public key crypto-module 460, or a decoding module, may restore the R corresponding to the challenge by decoding the Q using the private key. An OTP element 470, or an OTP generator, may generate an OTP using the restored R. When the generated OTP is provided to the external CA again, the external CA itself may perform an OTP authentication process by verifying whether the generated OTP is matched or not using the R.

Figure 4B:
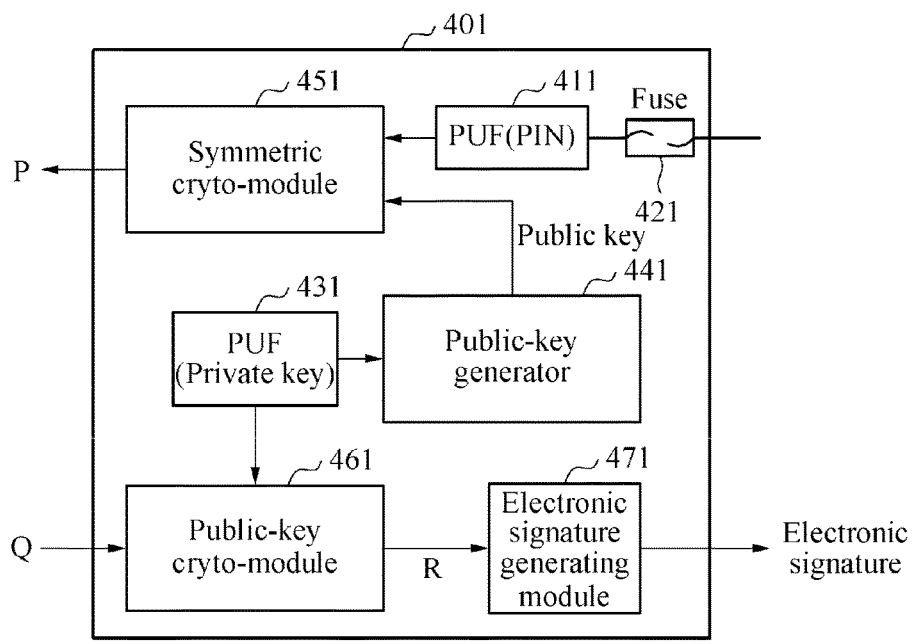

FIG. 4B is a diagram illustrating a portion of a hardware-based security element according to another example embodiment. As illustrated, a security element 401 may have a similar structure to the security element 400 illustrated in FIG. 4A. An illustrated configuration including, for example, a PUF(PIN) 411 through a public key crypto-module 461, or a decoding module, may be construed as being similar to the configuration illustrated in FIG. 4A.

Although FIG. 4A illustrates an example in which the OTP element 470 generates the OTP using the R for OTP authentication, FIG. 4B illustrates an example in which an electronic signature generating module 471 generates an electronic signature and provides the generated electronic signature. Such an electronic signature may be used for authentication.

Figure 5:
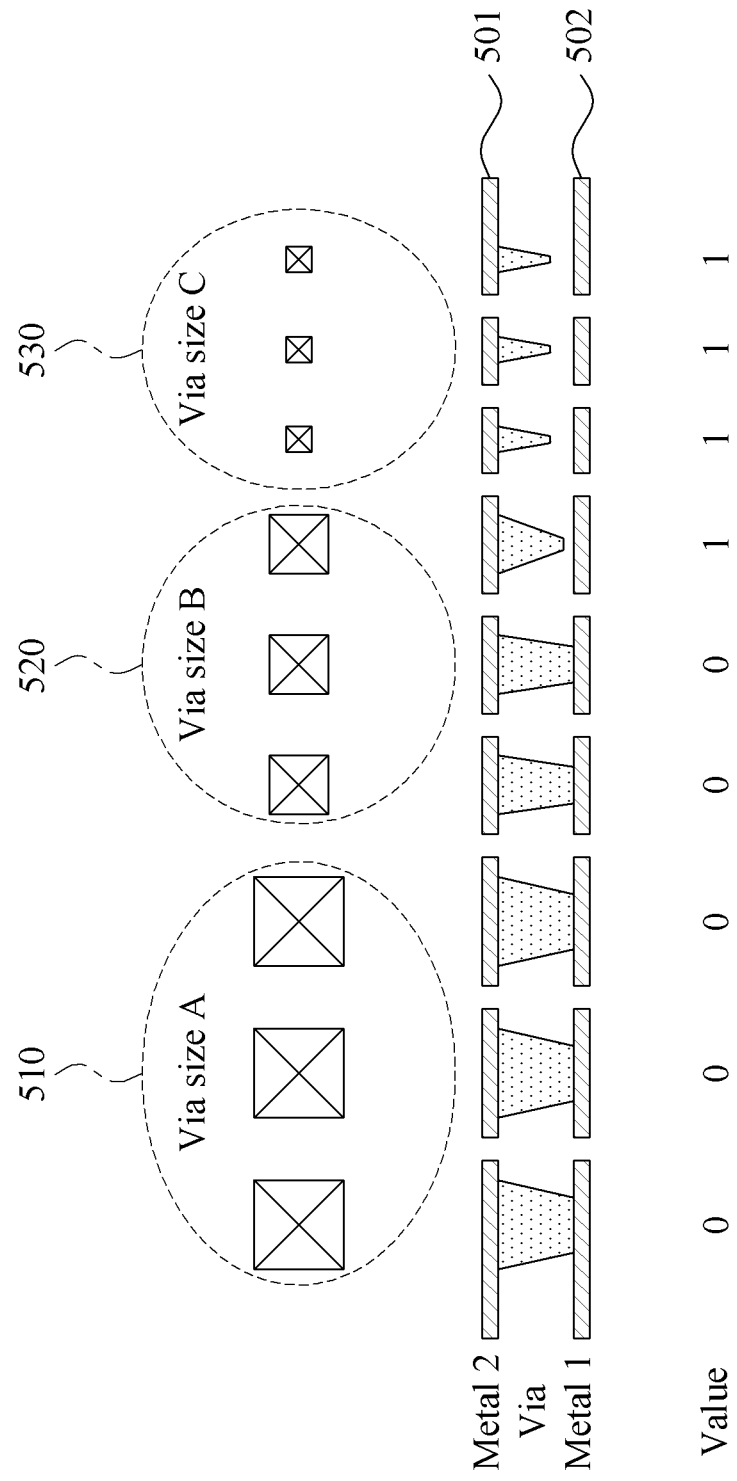
FIG. 5 is a diagram illustrating a physical unclonable function (PUF) according to an embodiment.

FIG. 5 is a diagram illustrating a PUF according to an embodiment.

A variety of examples of a method of implementing a PUF may exist. Thus, implementation of a PUF is not limited by an example embodiment or details provided hereinafter.

A PUF may provide an unpredictable digital value. Individual PUFs may have an accurate manufacturing process, and thus digital values provided by the individual PUFs may differ from one another although a same manufacturing process is applied. Thus, the PUF may also be referred to as a physical one-way function (POWF) practically impossible to be duplicated, or as a physical random function (PRF).

Such a PUF may be included as at least a portion of a hardware-based security element, and used to generate a password key for authentication. For example, the PUF may be used to provide a unique key to distinguish devices from one another.

For example, the PUF may be embodied as a coated PUF implemented using particles randomly doped on a top layer of an integrated circuit (IC) and, most recently, a butterfly PUF that is possible to be implemented in a field-programmable gate array (FPGA) using a process variation in a complementary metal-oxide-semiconductor (CMOS) device that is generally used for a hardware chip such as a latch.

However, to improve reliability of the PUF to commercialize such applications of the PUF used to generate a PIN, there is a need to ensure physical unclonability of a PUF circuit itself, randomness of a generated PIN value, and time-invariance of the generated PIN value that does not change over time once generated. However, most existing PUF circuits may fail to ensure a high level of at least one of the randomness and the time-invariance that need to be satisfied as a PUF or a PRF, and thus the commercialization may not be readily achieved.

The PUF used herein may ensure a reliable level of the randomness and the time-invariance by solving such an existing issue, and also may be produced at an extremely low unit price in a semiconductor manufacturing process. According to an example embodiment, to simultaneously satisfy the randomness and the time-invariance of the PIN generated by the PUF, a random digital value may be generated using randomness based on whether a short circuit is present between nodes present in a semiconductor process.

As illustrated in FIG. 5, a PUF may implement a size of a contact or via used to electrically connect conductive layers or metals in a semiconductor chip to be a size for reliable connection in the process, for example, a size smaller than a design rule, to randomly determine the short circuit. That is, a random PIN value may be generated by intentionally violating the design rule. Such a new PUF circuit may be easily implemented because it is configured as an extremely simple short circuit without an additional circuit or process and without a special measuring device. In addition, since a characteristic of the process is used, stability may be satisfied while the randomness of a value is being maintained.

A detailed description of PUF generation will be provided hereinafter. In a semiconductor manufacturing process, vias are formed between a first metal layer 502 and a second metal layer 501. In a group 510 in which a size of vias is set to be sufficiently large based on the design rule, all the vias may short-circuit the first metal layer 502 and the second metal layer 501, and a result of determination of the short-circuit may be expressed as a digital value of 0.

In a group 530 in which a size of vias is set to be extremely small, all the vias may not short-circuit the first metal layer 502 and the second metal layer 501, and thus a result of determination of the short-circuit may be expressed as a digital value of 1.

In a group 520 between the group 510 and the group 530, some vias may short-circuit the first metal layer 502 and the second metal layer 501, and the other vias may not short-circuit the first metal layer 502 and the second metal layer 501.

According to an example embodiment, the PUF may be configured by setting the size of vias to be the size set in the group 520 in which some vias may short-circuit the first metal layer 502 and the second metal layer 501 and the other vias may not short-circuit the first metal layer 502 and the second metal layer 501. A design rule on a via size may differ based on a semiconductor manufacturing process. For example, when a via design rule sets 0.25 micron (μm) in a 0.18 micron (μm) CMOS process, a via size for implementing a PUF may need to be set as 0.19 μm to stochastically distribute short-circuit results among metal layers. Such a stochastic distribution of the short-circuit results may be desirably 50% likelihood of short-circuit. The via size may be set through experiments and adjustments based on a detailed semiconductor process. Thus, a PUF may be provided to ensure randomness and time-invariance of a secret key or a private key, and accordingly tamper-resistance for responding to a physical attack may not be required.

The tamper-resistance that is mainly used in an encoding module to respond to such a physical attack as, for example, depackaging, a layout analysis, and a memory attack, may protect an internal content by disallowing a function of a device to normally operate through, for example, content removal of a memory device when there is an attempt to cancel or release the device. In such a case, an additional protective device may be required or an implementing method may become more complicated, and thus a cost may increase and unintentional damage, for example, data removal due to a mistake made by a user or a failure of a device, may occur in the device. However, such an issue may not occur by implementing the PUF based on a principle described with reference to FIG. 5.

In the PUF implemented using such a method, since it is not easy to separate individual cells and observe each cell, it may not be possible to select PUF related cells from tens of thousands, or hundreds of thousands, of chips of a gate, and observe related values. In addition, since a value for some PUF is set only when the PUF operates in a state where power is on, estimating an original value may not be easy due to a value different from an ordinary value when a portion of a chip is damaged in a process of, for example, depackaging, for a physical attack. Thus, using PUF may provide a secret key and a private key that may have a configuration robust against a physical attack and maintain randomness and time-invariance without requiring an additional cost, dissimilar to the tamper-resistance.

As described above, for a security zone at a risk level 4 that requires a top security level, a gate keeper providing multi-system security may be disposed on a conduit, and at least a portion of a plurality of security elements included in the gate keeper may be embodied or implemented by the PUF to ensure extremely high level security.

Figure 6:
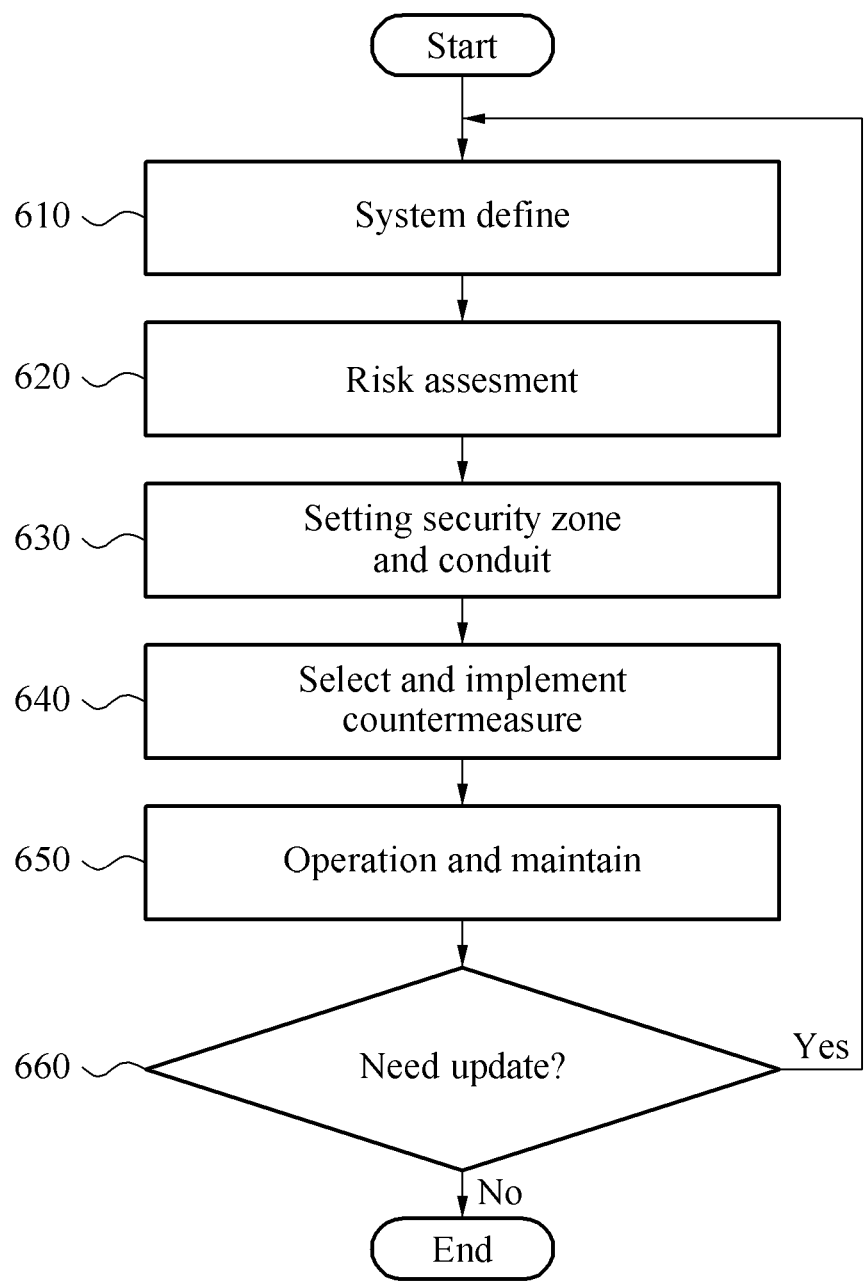
FIG. 6 is a flowchart illustrating a method of designing a vehicular security network device according to an embodiment.

FIG. 6 is a flowchart illustrating a method of designing a vehicular security network device according to an example embodiment.

According to an example embodiment, in operation 610, a system to be a target of a risk level assessment is defined. The system may include at least one of a vehicle, functional elements of the vehicle, and a traffic system that may be a target to which a security countermeasure is to be provided and for which a type of the security countermeasure is to be determined. In such an operation, in addition to the system to be the target of the risk level assessment, a network connectivity structure of each system and a functional classification in designing the vehicle may be determined The defining may be construed as setting a parameter through an external input. In the operation, a minimum performance required by the system, or a scope of a requirement to be satisfied even after the security countermeasure is selected and implemented may be determined.

In operation 620, risk assessment is performed on the functional elements of the target of such an assessment. Here, a risk level of the vehicle and the traffic system may be assessed by combining a level of likelihood of damage (D) indicating a level of a likelihood of damage to be incurred by a security attack, a level of severity (S) of the damage when the damage occurs, and a level of controllability (C) indicating a level of a likelihood of escaping from a situation where an accident occurs under the control of a driver or a system. The level of likelihood of damage (D), the level of severity (S), and the level of controllability (C) may be assessed in this operation, or may be input as values set based on a pre-assessed result. The level of severity and the level of controllability may use a concept introduced in an existing international standard ISO 26262, whereas the level of likelihood of damage by an attack may be newly defined.

The level of likelihood of damage (D) by a security attack will be described hereinafter. According to an example embodiment, the level of likelihood of damage (D) by an external security attack may be determined by a combination of a level of threat realized (T) and a level of vulnerability exploited (V).

Here, the level of threat realized (T) may be assessed as a potential likelihood of a security attack, and be set based on a human resource of an attacker, a material resource, and an amount of time used. For example, a level of relevant knowledge and experience required for such an attack is lower and a level of equipment required for the attack is lower, the level of threat realized (T) may be assessed to be higher. Tables 1 and 2 below illustrate example assessment matrices.

TABLE 1

| Assessment criteria | Details | Level | Description |
| --- | --- | --- | --- |
| Required skill level | General person | High | A person who has no or lacks a relevant knowledge or experience |
| | Skilled person | Middle | A person who has a relevant knowledge or experience, and is able to use an existing attack method |
| | Security expert | Low | A person who has a relevant knowledge and an experience relating to a security attack, and is able to present a new attack method |
| Attack resource | General/no equipment | High | General equipment that is immediately usable |
| | Expert/ purchased equipment | Middle | Equipment that is purchasable without an effort |

TABLE 1-continued

| Assessment criteria | Details | Level | Description |
|---|---|---|---|
| | Customized/ manufactured equipment | Low | Equipment that is not generally purchasable or is extremely expensive, or needs to be customized |
| Attack time | Immediately | High | A system may malfunction within a short period of time after an attack starts |
| | During traveling time | Middle | A system may malfunction by an attack when a vehicle is powered on |
| | Long time other than above | Low | A long period of time for malfunction of a system of a vehicle |

TABLE 2

Level of threat realized (T)

| Skill level | Attack resource | Attack time High | Middle | Low |
|---|---|---|---|---|
| High | High | T 3 | T 3 | T 3 |
| | Middle | T 3 | T 3 | T 2 |
| | Low | T 3 | T 2 | T 1 |
| Middle | High | T 3 | T 3 | T 2 |
| | Middle | T 3 | T 2 | T 1 |
| | Low | T 2 | T 1 | — |
| Low | High | T 3 | T 2 | T 1 |
| | Middle | T 2 | T 1 | — |
| | Low | T 1 | — | — |

In addition, the level of vulnerability exploited (V) may be assessed based on an openness of the target system, which is based on how information of a target of an attack is externally disclosed, how frequently is the information used, and a method of getting an access to the information. When a frequency of using the information is high, a more amount of such information is externally disclosed, and an access level is more open, the level of vulnerability exploited (V) may be assessed to be higher. Tables 3 and 4 below illustrate example assessment matrices.

TABLE

| Assessment criteria | Details | Level | Description |
|---|---|---|---|
| Frequency of use | High | High | Each time of driving or travelling/each moment |
| | Middle | Middle | One or two times per month/often |
| | Low | Low | One or two times per annum/occasionally |
| Disclosure of information | Open | High | Open through Internet and provision manual |
| | Open to related person | Middle | Possessed by after service (AS) centers, manufacturers, component makers, and the like |
| | Confidential | Low | Open to some having a right among AS centers, manufacturers, and component makers |
| Access level | Open | High | Accessible through an Internet network or by an unauthorized person |
| | General user | Middle | Accessible only by a driver |
| | Special user | Low | Accessible by a right of AS centers, manufacturers, and component makers |

TABLE 4

Level of vulnerability exploited (V)

| Frequency of use | Disclosure of information | Access level High | Middle | Low |
|---|---|---|---|---|
| High | High | V 3 | V 3 | V 3 |
| | Middle | V 3 | V 3 | V 2 |
| | Low | V 3 | V 2 | V 1 |
| Middle | High | V 3 | V 3 | V 2 |
| | Middle | V 3 | V 2 | V 1 |
| | Low | V 2 | V 1 | — |
| Low | High | V 3 | V 2 | V 1 |
| | Middle | V 2 | V 1 | — |
| | Low | V 1 | — | — |

When the level of threat realized (T) and the level of vulnerability exploited (V) are determined based on the example matrices illustrated in Tables 1 through 4, the level of likelihood of damage (D) may be determined by the combination thereof as follows. Table 5 below illustrates an example assessment matrix.

TABLE 5

Level of likelihood of damage (D)

| | Vulnerability exploited | | |
|---|---|---|---|
| Threat realized | V = 3 | V = 2 | V = 1 |
| T = 3 | D 4 | D 3 | D 2 |
| T = 2 | D 3 | D 2 | D 1 |
| T = 1 | D 2 | D 1 | — |

For assessment of a risk level, the level of severity (S) that is assessed along with the level of likelihood of damage (D) may be determined as follows. Table 6 below illustrates an example assessment matrix.

TABLE 6

| | Description | | | |
|---|---|---|---|---|
| | No injury | Slight injury | Serious injury (Survived) | Fatal injury (Life threatening) |
| Level of severity (S) | S0 | S1 | S2 | S3 |

In addition, the level of controllability (C) indicating the level of a likelihood of escaping from a risk under the control of a driver or a separate system in a situation where an accident is possible to occur may be determined as follows. Table 7 below illustrates an example assessment matrix.

TABLE 7

| | Description | | | |
|---|---|---|---|---|
| | Controllable | Simply controllable | Generally controllable | Difficult to control |
| Situation | — | 99% or more avoid a danger | 90% or more avoid a danger | Less than 90% barely avoid a danger |
| Level of controllability (C) | C0 | C1 | C2 | C3 |

As described above, when the level of likelihood of damage (D), the level of severity (S), and the level of controllability (C) are determined, the risk level may be assessed by the combination thereof as follows. Table 8 below illustrates an example assessment matrix.

TABLE 8

| Level of severity (C) | Level of likelihood of damage (D) | Level of controllability (C) | | |
|---|---|---|---|---|
| | | C 3 | C 2 | C 1 |
| S 3 | D 4 | Risk 4 | Risk 4 | Risk 3 |
| | D 3 | Risk 4 | Risk 3 | Risk 3 |
| | D 2 | Risk 3 | Risk 3 | Risk 2 |
| | D 1 | Risk 3 | Risk 2 | Risk 2 |
| S 2 | D 4 | Risk 4 | Risk 3 | Risk 3 |
| | D 3 | Risk 3 | Risk 3 | Risk 2 |
| | D 2 | Risk 3 | Risk 2 | Risk 2 |
| | D 1 | Risk 2 | Risk 2 | Risk 1 |
| S 1 | D 4 | Risk 3 | Risk 3 | Risk 2 |
| | D 3 | Risk 3 | Risk 2 | Risk 2 |
| | D 2 | Risk 2 | Risk 2 | Risk 1 |
| | D 1 | Risk 2 | Risk 1 | Risk 1 |

Although the assessed levels illustrated in Tables 1 through 8 may be expressed as a result of ranking, each assessed level may be expressed as a risk level vector according to another example embodiment. In such a case, a risk level may be assessed by a vector including seven core security requirements. For example, the seven core security requirements may include access control (AC), use control (UC), data integrity (DI), data confidentiality (DC), restrict data flow (RDF), timely response to event (TRE), and resource availability (RA), which are presented in IEC 62443 that is an international standard relating to industrial network and system security. As necessary, a new requirement suitable for a characteristic of vehicle and traffic system security may be added.

In operation 630, a security zone and a conduit are set using the risk level assessed for the functional elements. According to an example embodiment, functional elements having a same assessed risk level may be used to set a same security zone. In addition to whether the risk level is the same, a network connectivity topology based on a structure of a vehicle, a role and a type of a functional element, a design requirement for preventing a duplicated design, and a system performance may be also used to set a security zone. Here, security zones may be set to be hierarchical to one another or independent from one another.

A portion in which internal elements of the set security zone are connected to an external network of the security zone may be the conduit. To one conduit, a security countermeasure corresponding to a risk level of a security zone corresponding to the conduit may be provided.

In operation 640, the security countermeasure is selected and implemented. A risk level assessed for security elements included in a security zone may be a risk level representing the security zone. The security countermeasure corresponding to the risk level may be selected and disposed on the conduit of the security zone. Here, the risk level may be construed as a target security level corresponding to the security zone.

The security countermeasure may be implemented by a gate keeper. The gate keeper may be selected to satisfy a security requirement for the security zone and the conduit, and to have an achieved security level (SL_A) higher than a target security level (SL_T).

The target security level SL_T may be determined by identifying a risk source and assigning a risk level in a state where the security countermeasure is absent. The achieved security level SL_A may be determined by applying a security countermeasure to each security zone and each conduit, and assessing whether the security countermeasure responds to all identified risk sources. When the achieved security level SL_A for a certain security level or an internal security element thereof is maintained to be higher than the target security level SL_T, it may be understood that safe designing is performed.

In a case of maintenance and repair, a change in an existing external threat and an appearance of a new security threat, an exposure of a system vulnerability, and the like may affect the target security level SL_T, whereas deterioration in performance of the security countermeasure that is operating and cancellation or invalidation thereof may affect the achieved target level SL_A. That is, the security level may be used to determine whether to update the security countermeasure and when to update the security countermeasure in a current sate.

Table 9 below illustrates an example security level and a corresponding security countermeasure. In Table 9, the security level may be one of the target security level SL_T and the achieved security level SL_A. In addition, the security level may correspond to an assessed risk level.

TABLE 9

| Security level | Basic designing method | Authentication method (gate-keeper) | Key storing | Function maintenance period |
|---|---|---|---|---|
| 4 | Maximum level authentication | Multi system | PUF (unclonable) | Realtime |
| 3 | Higher level authentication | Two factor & channel | Core-independent | Every operation |
| 2 | Multiple authentication | Two factor | Memory-independent | Sometimes |
| 1 | Simple authentication | simple | Stored in memory | Rarely |

Figure 9:
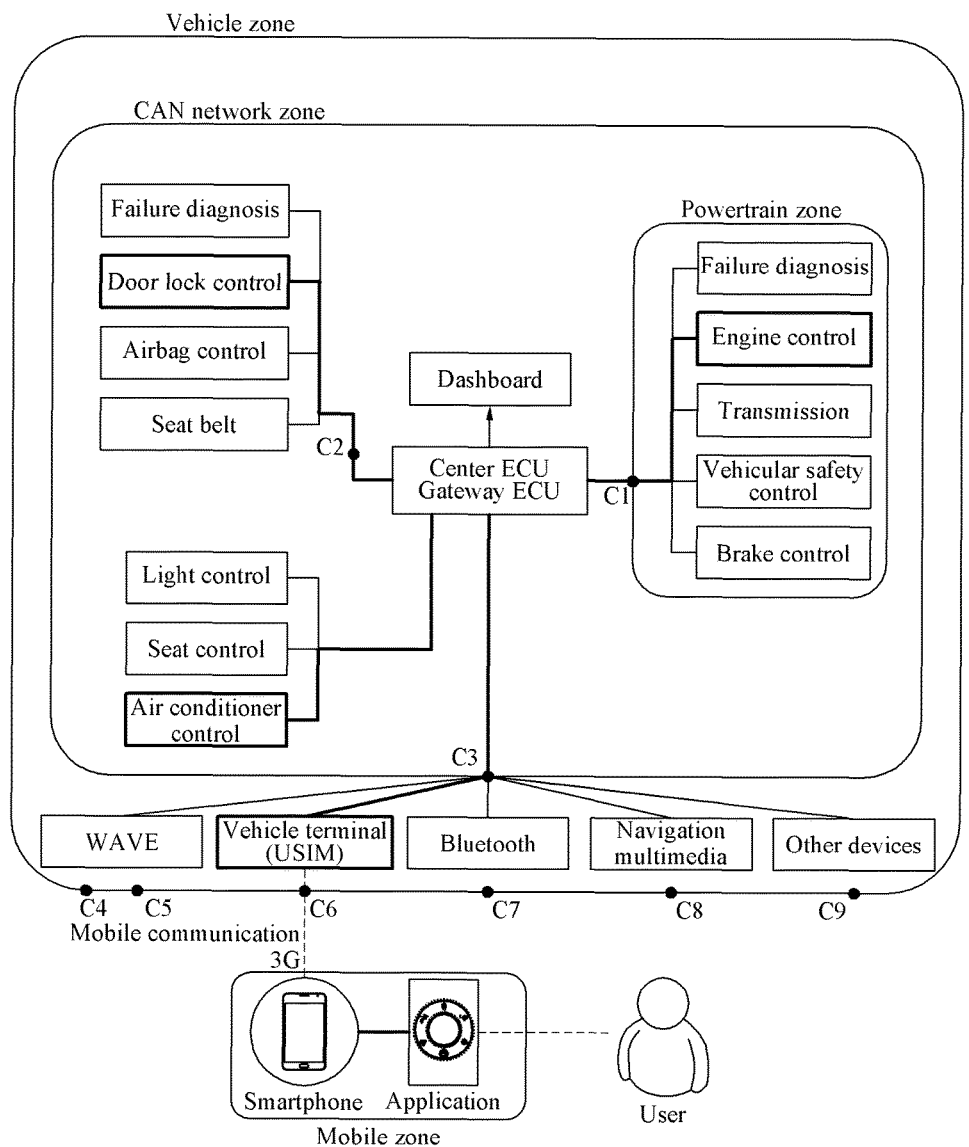
FIG. 9 is a diagram illustrating a security zone and a conduit based on a vehicular security network design according to an embodiment.

As described above, a hardware-based security element by a PUF may be at least a portion of multi-system security for security level 4 illustrated in FIG. 9. When a security level is lower, a gate keeper with a lower complexity and/or a small cost for implementation (e.g., cost and time for implementation) may be selected as an authentication method.

In operation 650, a vehicular security network designed through such operations is operated and maintained. In operation 660, whether to update is determined based on continuous monitoring, information collection, and a request by a subject having a management right. When the updating is determined to be needed, at least a portion of operations 610 through 650 may be repetitively performed, and thus a feedback structure may be maintained.

Figure 7:
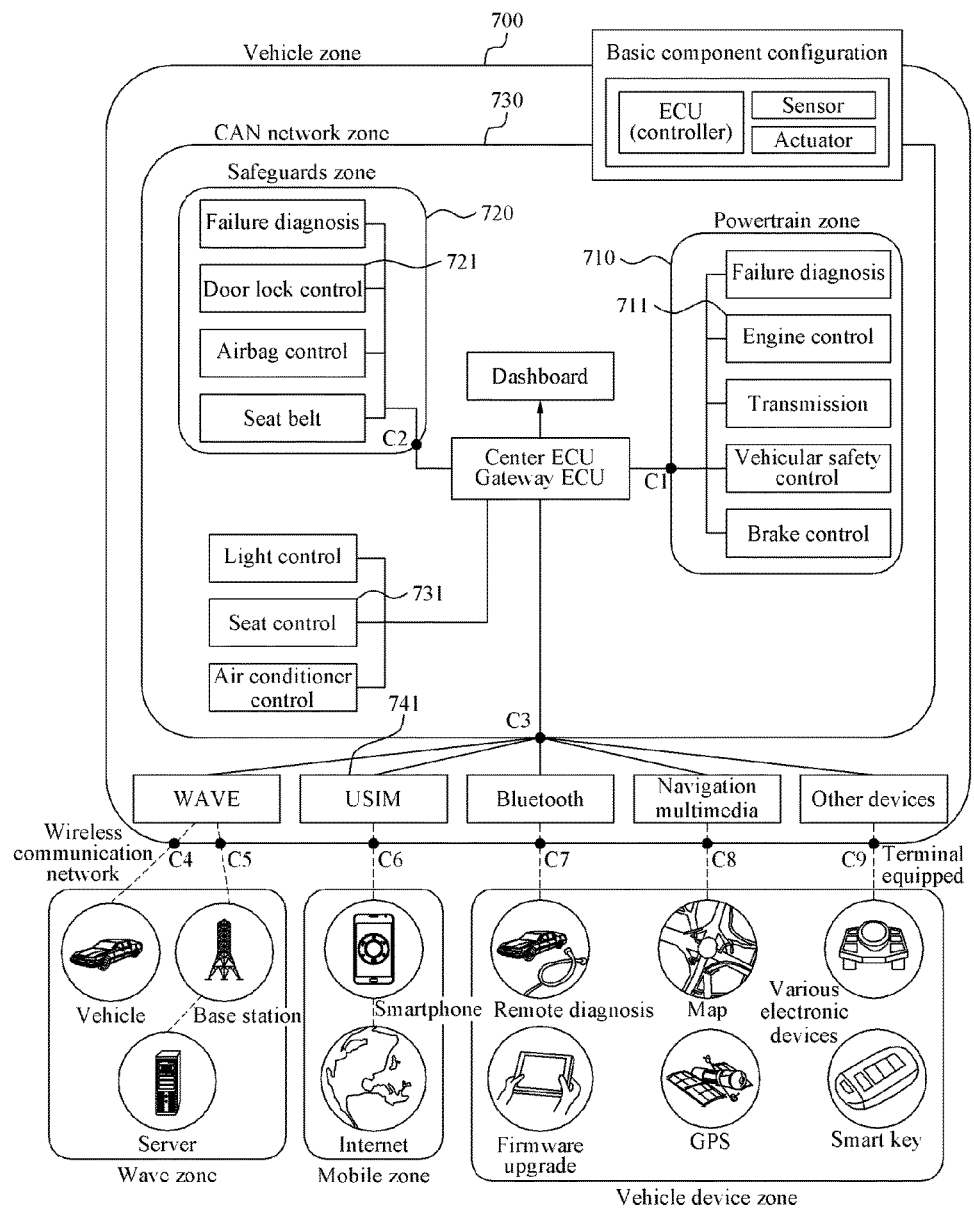
FIG. 7 is a diagram illustrating a vehicular security network device and a traffic system according to an embodiment.

FIG. 7 is a diagram illustrating a vehicular security network device and a traffic system according to an example embodiment.

A plurality of security zones and conduits is set. For example, a powertrain zone 710, a safeguard zone 720, and a controller area network (CAN) zone 730 are set. As illustrated, the powertrain zone 710 and the safeguard zone 720 may be a subzone of the CAN zone 730. Such a structure may be an example of hierarchical zone setting.

In the illustrated example, a basic configuration of functional elements or components performing each function may include a sensor, an electronic control unit (ECU), and an actuator. Examples of the functional elements may be a functional element 711 configured to control an engine, a functional element 721 configured to control a door lock, and a functional element 731 configured to control a seat. An ECU of a functional element may communicate with an ECU of another functional element through a center ECU or a gateway ECU in a CAN network, which is a distributed network. In FIG. 7, "C(n)" indicates a secure conduit. For example, a conduit C1 corresponds to the powertrain zone 710, and a conduit C2 corresponds to the safeguard zone 720. A conduit C3 of the CAN zone 730 is a conduit included in a vehicle zone 700 of an entire vehicle and connects, to the CAN zone, various means communicating with an external source of the vehicle. For example, a universal subscriber identity module (USIM) 741 corresponding to a communication terminal in the vehicle may be connected to a smartphone or Internet through a conduit C6. In such a process, security authentication of the USIM itself may be used, but a gate keeper may be additionally provided to the conduit C6 as described above.

Figure 8:
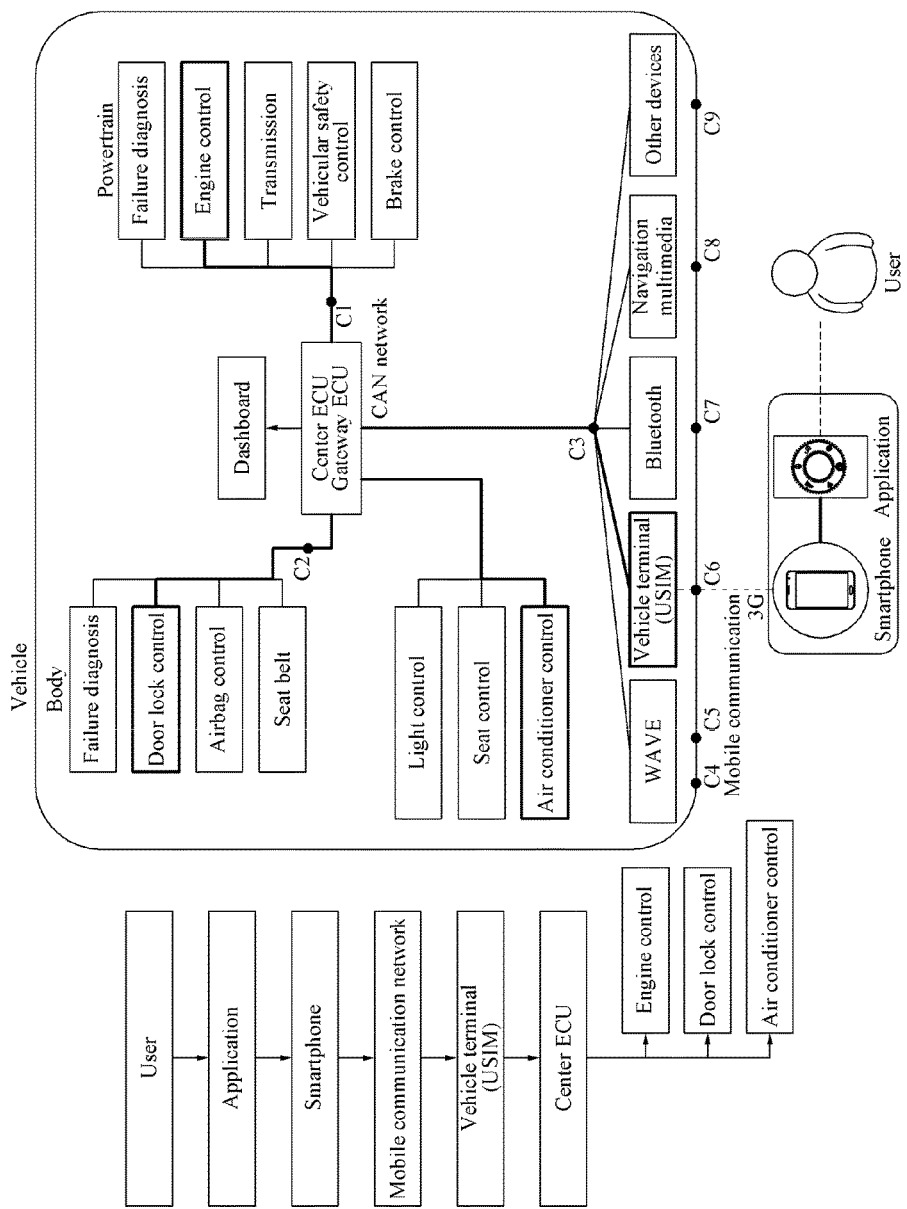
FIG. 8 is a diagram illustrating a control access path of a vehicular security network device according to an embodiment.

FIG. 8 is a diagram illustrating a control access path of a vehicular security network device according to an embodiment.

An illustrated configuration may be referred to describe an example of performing risk assessment on security elements. Roles of functional elements and connection relationships among the functional elements are described with reference to FIG. 8.

Here, functional elements (FEs) associated with controlling a vehicle by a user through an application of a smartphone of the user are illustrated. The user, for example, an owner of the vehicle, may execute the application of the smartphone to exchange a signal with a mobile communication terminal USIM in the vehicle through a third generation/fourth generation (3G/4G) network or through the Internet. The signal may access some of the functional elements through an internal network of the vehicle after passing through a center ECU. For example, the signal may access a functional element for controlling an engine, a functional element for controlling a door lock, and a functional element for controlling an air conditioner.

Such an access to these illustrated functional elements may have a target path that passes through the application, the smartphone, and the center ECU from the user. To provide such a service, a risk source may be identified and risk assessment may be performed.

A damage scenario about damage that may occur due to a failure or occur in a target of a security attack may be analyzed. An attack scenario may be drafted by analyzing an estimated attack point. A simple example of such a damage/attack scenario will be described hereinafter, and more various and greater attack targets and vulnerabilities in security may exist in reality. Table 10 below illustrates selection of a failure/attack target and a damage scenario, and Table 11 illustrates security vulnerabilities. In the tables below, codes are randomly assigned for risk assessment to be performed later, and "Cx" indicates a network conduit, wherein "x" denotes a natural number.

TABLE 10

| Identification | Failure target | Damage scenario |
|---|---|---|
| A1 | Engine control | A sudden unintended acceleration of a vehicle, a sudden stop of a vehicle while travelling, an increase in revolutions per minute (RPM) of an engine while travelling |

TABLE 10-continued

| Identification | Failure target | Damage scenario |
|---|---|---|
| A2 | Door lock control | An accident caused by door opened while travelling, and an intrusion into a vehicle through door lock cancellation |
| A3 | Air conditioner control | A drastic increase and decrease in a temperature in a vehicle |
| Cx | Vehicular network | A denial of service (DoS) attack made on a CAN network of a vehicle |

TABLE 11

| Identification | Vulnerability in security | Attack scenario |
|---|---|---|
| B1 | Application and smartphone | Obtaining user information and transmitting an abnormal command, by hacking an application and a smartphone of a user |
| B2 | Mobile communication network | Making a re-use attack and interruption by obtaining a message to be transmitted through a mobile communication network |

Here, a level of likelihood of damage (D), a level of severity (S), and a level of controllability (C) may be analyzed based on the failure target and the damage scenario. Risk analysis may be performed based on a worst damage scenario for each target. Table 12 below illustrates example results from the analysis.

TABLE 12

| Failure target | Damage scenario | Severity | Controllability |
|---|---|---|---|
| Engine control | A forward collision due to sudden unintended acceleration of a vehicle | S = 2 | C = 3 |
| | A stop of a vehicle while travelling | S = 1 | C = 1 |
| | An increase in an engine RPM and an increase in a speed while travelling | S = 1 | C = 2 |
| Door lock control | An accident caused by door opened while travelling | S = 2 | C = 0 |
| | An intrusion into a vehicle is allowed due to door lock cancellation | S = 0 | C = 3 |
| Air conditioner control | A drastic increase and decrease in a temperature in a vehicle | S = 0 | C = 0 |
| Network | C1 A DoS attack made between a center ECU and a powertrain network | S = 3 | C = 3 |
| | C2 A DoS attack made between a center ECU and a safeguard network | S = 1 | C = 3 |
| | C3 A DoS attack made between a center ECU and a USIM terminal | S = 0 | C = 3 |
| | C6 An attack made on a mobile network due to DoS and a jamming signal | S = 0 | C = 3 |

Here, based on a security vulnerability to which damage may be likely to be done and an attack scenario for the security vulnerability, a level of threat realized (T), a level of vulnerability exploited (V), and a level of likelihood of damage (D) may be calculated as illustrated in Table 13 below.

TABLE 13

| Attack point security vulnerability | Level of threat realized (T) | | | | Level of vulnerability exploited (V) | | | | Level of likelihood of damage (D) D(n) |
|---|---|---|---|---|---|---|---|---|---|
| | Level of skill | Attack resource | Attack time | T(n) | Frequency of use | Disclosure of information | Access level | V(n) | |
| Application and smartphone | Middle | Middle | High | T3 | High | Low | Middle | V2 | D3 |
| Mobile communication network | Low | Low | High | T1 | High | Middle | High | V3 | D2 |

Here, the calculated level of likelihood of damage (D) may be combined with the level of severity (S) and the level of controllability (C), and thus a final risk level is assessed as illustrated in Table 14 below.

TABLE 14

| Corresponding risk | S/C/D level | Risk level | Core security requirements | Conduit of corresponding risk |
|---|---|---|---|---|
| A1/B1 | 2/3/3 | Risk 3 | TRE, UC/UC | Engine ECU~APP |
| A1/B2 | 2/3/2 | Risk 3 | TRE, UC/DI, DC, RDF | Engine ECU~mobile network |
| A2/B1 | 2/0/3 | — | | |
| A2/B2 | 2/0/2 | — | | |
| A3/B1 | 0/0/3 | — | | |
| A3/B3 | 0/0/2 | — | | |
| C1/B1 | 3/3/3 | Risk 4 | AC, RA/UC | Powertrain zone~APP |
| C1/B2 | 3/3/2 | Risk 3 | AC, RA/DI, DC, RDF | Powertrain zone~mobile network |
| C2/B1 | 1/3/3 | Risk 3 | AC, RA/UC | Safeguard zone~APP |
| C2/B2 | 1/3/2 | Risk 2 | AC, RA/DI, DC, RDF | Safeguard zone~mobile network |
| C3/B1 | 0/3/3 | — | | |
| C3/B2 | 0/3/2 | — | | |
| C6/B1 | 0/3/3 | — | | |
| C6/B2 | 0/3/2 | — | | |

A target security level may be determined by converting the risk assessment result described above to the core security requirements. Based on a higher risk level, details of a vector may be filled. As a result, a target security level SL_T vector V={AC, UC, DI, DC, RDF, TRE, RA}={4,4,3,3,3,3,4} may be obtained. In response to such an assessment result, a process of assigning a security countermeasure in response to a security zone and a conduit may be performed with reference to FIG. 9.

FIG. 9 is a diagram illustrating a security zone and a conduit based on a vehicular security network design according to an embodiment.

Based on risk assessment as described with reference to the example provided above, a security zone may be set based on each risk path. AS illustrated, AC, RA, and UC are assigned to risk 4, which is assigned from an application through a powertrain zone. Risk 3 is assigned from the application through a safeguard zone. Here, a security zone and a conduit may be determined as illustrated because a mobile zone is disclosed.

When designing a vehicular security system based on such a result, an optimal design may include assigning a gate keeper corresponding to risk 3 to at least one combination among a conduit C3 and conduit C6 present in a path from the application to a center ECU through a vehicle terminal, and assigning a gate keeper corresponding to risk 4 to a conduit C1 for an access to the powertrain zone.

The description provided above relates to performing example assessment on one simple example. In actuality, a series of operations including assessing a risk for a vehicle, setting a security zone and a conduit, assigning a security level to a corresponding security zone, and assigning a corresponding security countermeasure to a corresponding conduit may require more complicated factors. In addition, other risk factors of the vehicle may need to be used for analysis. Thus, the description provided above is an illustrative example only, and various modifications may be made.

Figure 10:
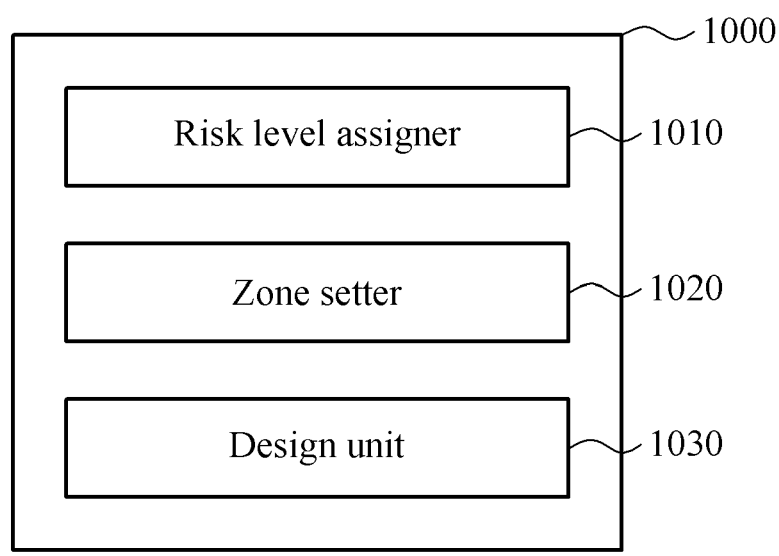
FIG. 10 is a block diagram illustrating a vehicular security network designing device.

FIG. 10 is a block diagram illustrating a vehicular security network designing device.

A vehicular security network designing device 1000 including at least one processor may be embodied. The vehicular security network designing device 1000 may include a risk level assigner 1010, a zone setter 1020, and a design unit 1030, and at least one of these may be implemented by the processor.

The risk level assigner 1010 may assign a risk level to each of a plurality of functional elements connected to a CAN of a vehicle based on a result of lookup from a risk assessment matrix, in response to an input of a level of likelihood of damage (D) by a security attack, a level of severity (S) of the damage when the damage occurs, and a level of controllability (C) of the damage when the damage occurs. For the risk level assessment, reference may be made to the descriptions provided with reference to Tables 1 through 8.

The zone setter 1020 may set at least one security zone by grouping the plurality of functional elements into the security zone based on the assigned risk level. The zone setter 1020 may set security zones by grouping functional elements having a same assigned risk level into one security zone. According to an example embodiment, the zone setter 1020 may calculate a security level vector including the assigned risk level and core security requirements for the functional elements, and set the at least one security zone by grouping the functional elements based on the calculated security level vector. For the setting of a security zone and a conduit, reference may be made to the descriptions provided with reference to FIGS. 2 and 6.

The design unit 1030 may dispose, on a conduit between a first security zone among the at least one security zone and an external network, a first gate keeper corresponding to a first risk level of the first security zone. Here, when the first risk level is higher than or equal to a predetermined level, the first gate keeper may be selected to include a plurality of independent security elements. In such a case, at least one of the independent security elements may be a hardware-based security element, for example, a security element using an authentication key to be held by a PUF. For a detailed description of designing the vehicular security network including disposing a gate keeper, reference may be made to the descriptions provided with reference to FIGS. 2 through 6.

The units described herein may be implemented using hardware components and software components. For example, the hardware components may include microphones, amplifiers, band-pass filters, audio to digital convertors, non-transitory computer memory and processing devices. A processing device may be implemented using one or more general-purpose or special purpose computers, such as, for example, a processor, a controller and an arithmetic logic unit, a digital signal processor, a microcomputer, a field programmable array, a programmable logic unit, a microprocessor or any other device capable of responding to and executing instructions in a defined manner. The processing device may run an operating system (OS) and one or more software applications that run on the OS. The processing device also may access, store, manipulate, process, and create data in response to execution of the software. For purpose of simplicity, the description of a processing device is used as singular; however, one skilled in the art will appreciated that a processing device may include multiple processing elements and multiple types of processing elements. For example, a processing device may include multiple processors or a processor and a controller. In addition, different processing configurations are possible, such a parallel processors.

The software may include a computer program, a piece of code, an instruction, or some combination thereof, to independently or collectively instruct or configure the processing device to operate as desired. Software and data may be embodied permanently or temporarily in any type of machine, component, physical or virtual equipment, computer storage medium or device, or in a propagated signal wave capable of providing instructions or data to or being interpreted by the processing device. The software also may be distributed over network coupled computer systems so that the software is stored and executed in a distributed fashion. The software and data may be stored by one or more non-transitory computer readable recording mediums.

The methods according to the above-described example embodiments may be recorded in non-transitory computer-readable media including program instructions to implement various operations of the above-described example embodiments. The media may also include, alone or in combination with the program instructions, data files, data structures, and the like. The program instructions recorded on the media may be those specially designed and constructed for the purposes of example embodiments, or they may be of the kind well-known and available to those having skill in the computer software arts. Examples of non-transitory computer-readable media include magnetic media such as hard disks, floppy disks, and magnetic tape; optical media such as CD-ROM discs, DVDs, and/or Blue-ray discs; magneto-optical media such as optical discs; and hardware devices that are specially configured to store and perform program instructions, such as read-only memory (ROM), random access memory (RAM), flash memory (e.g., USB flash drives, memory cards, memory sticks, etc.), and the like. Examples of program instructions include both machine code, such as produced by a compiler, and files containing higher level code that may be executed by the computer using an interpreter. The above-described devices may be configured to act as one or more software modules in order to perform the operations of the above-described example embodiments, or vice versa.

While this disclosure includes specific examples, it will be apparent to one of ordinary skill in the art that various changes in form and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

The invention claimed is:

1. A vehicular security network device, comprising:
a conduit comprising a network path configured to connect, to an external network, a first security zone distinguishable from another security zone in a network topology, the first security zone including a plurality of functional elements having a same risk level assessed based on a vehicular security risk assessment matrix; and
a first gate keeper disposed on the conduit and configured to control, via one or more hardware components and/or a processor executing instructions stored on memory, an access to the plurality of functional elements in the first security zone, the first gate keeper adapted, via the one or more hardware components and/or processor executing the instructions, to provide a security level corresponding to the risk level of the first security zone,
wherein the risk level is a result of lookup from the vehicular security risk assessment matrix using assessment values associated with a level of likelihood of damage (D) indicating a level of a likelihood of damage caused by a security attack, a level of severity (S) when the damage occurs, and a level of controllability (C) when the damage occurs.

2. The device of claim 1, wherein, when the risk level is higher than or equal to a predetermined level, the first gate keeper includes a plurality of independent security elements, and wherein the plurality of functional elements is connected to a controller area network (CAN) of a vehicle.

3. The device of claim 2, wherein at least one of the independent security elements is embodied by a hardware-based security element.

4. The device of claim 3, wherein the hardware-based security element uses an authentication key to be held by a physical unclonable function (PUF).

5. The device of claim 1, wherein the level of likelihood of damage (D) is determined by a combination of a level of threat realized (T) and a level of vulnerability exploited (V).

6. The device of claim 1, wherein the level of severity (S) and the level of controllability (C) are values assessed based on an ISO 26262.

7. The device of claim 1, wherein the first security zone is a subzone of a second security zone having a risk level lower than the risk level corresponding to the first security zone, the device further comprising:
a second gate keeper disposed on a conduit between the second security zone and the external network and configured to control an access to the second security zone.

8. The device of claim 7, wherein the second gate keeper includes a security element configured to provide lower-level security than that provided by the first gate keeper.

9. A vehicular security network designing device comprising at least one processor and memory, the device comprising:
a risk level assigner configured to assign, via the processor executing first instructions stored on the memory, a risk level to each of a plurality of functional elements connected to a controller area network (CAN) of a vehicle based on a result of lookup from a risk assessment matrix, in response to an input of a level of likelihood of damage (D) indicating a level of a likelihood of damage caused by a security attack, a level of severity (S) when the damage occurs, and a level of controllability (C) when the damage occurs;
a zone setter configured to set, via the processor executing second instructions stored on the memory, at least one security zone by grouping the plurality of functional elements into security zones based on the assigned risk level; and
a design unit configured to dispose, via the processor executing third instructions stored on the memory, on a conduit between a first security zone and an external network, a first gate keeper corresponding to a first risk level of the first security zone among the at least one security zone, the first security zone being distinguishable from other security zones in a network topology, and the first gate keeper configured to control, via one or more hardware components and/or a processor executing fourth instructions stored on the memory, a network access to the first security zone and to each functional element grouped into the first security zone.

10. The device of claim 9, wherein the zone setter is configured to group functional elements of a same assigned risk level into one security zone.

11. The device of claim 9, wherein the zone setter is configured to set the at least one security zone by calculating a security level vector including the assigned risk level and a core security requirement of the plurality of functional elements, and by grouping the plurality of functional elements based on the security level vector.

12. The device of claim 9, wherein, when the first risk level is higher than or equal to a predetermined level, the first gate keeper includes a plurality of independent security elements.

13. The device of claim 12, wherein at least one of the independent security elements is embodied by a hardware-based security element.

14. The device of claim 13, wherein the hardware-based security element uses an authentication key to be held by a physical unclonable function (PUF).

15. A method of designing a vehicular security network to be performed by hardware comprising at least one processor executing instructions stored in memory, the method comprising:
assessing a risk level of a plurality of functional elements of a vehicle using a risk assessment matrix;
setting at least one security zone by grouping the plurality of functional elements into security zones based on the assessed risk level; and
designing a first gate keeper of a security level corresponding to a first risk level of a first security zone among the at least one security zone to be disposed on a conduit between the first security zone and an external network, the first security zone being distinguishable from other security zones in a network topology, and the first gate keeper configured to control a network access to the first security zone and to each functional element grouped into the first security zone,
wherein the risk level is a result of lookup from the risk assessment matrix using assessment values associated with a level of likelihood of damage (D) indicating a level of a likelihood of damage caused by a security attack, a level of severity (S) when the damage occurs, and a level of controllability (C) when the damage occurs.

16. The method of claim 15, wherein the level of likelihood of damage (D) is determined by a combination of a level of threat realized (T) and a level of vulnerability exploited (V).

17. The method of claim 15, wherein the level of severity (S) and the level of controllability (C) are values assessed based on an ISO 26262.

* * * * *